United States Patent [19]
Csapo

[11] Patent Number: 5,910,946
[45] Date of Patent: Jun. 8, 1999

[54] WIRELESS INTERNET NETWORK ARCHITECTURE FOR VOICE AND DATA COMMUNICATIONS

[75] Inventor: John S. Csapo, Dallas, Tex.

[73] Assignee: Samsung Electronics Co., Ltd., Suwon, Rep. of Korea

[21] Appl. No.: 08/782,966

[22] Filed: Jan. 13, 1997

[51] Int. Cl.[6] .................................................. H04Q 7/30
[52] U.S. Cl. ..................... 370/328; 370/352; 455/561
[58] Field of Search ................................... 370/352, 353, 370/354, 355, 356, 310, 328, 329, 331, 338, 401, 400; 455/433, 435, 436, 437, 438, 439, 445, 466, 461, 561, 560; 375/242; 379/88.13, 88.17, 93.09, 93.11, 93.14, 93.15

[56] References Cited

U.S. PATENT DOCUMENTS

| | | | |
|---|---|---|---|
| 5,027,387 | 6/1991 | Moll | 379/112 |
| 5,173,933 | 12/1992 | Jabs et al. | 379/221 |
| 5,420,914 | 5/1995 | Blumhardt | 379/114 |
| 5,544,222 | 8/1996 | Robinson et al. | 455/561 |
| 5,555,298 | 9/1996 | Jonsson | 379/207 |
| 5,563,939 | 10/1996 | La Porta et al. | 379/220 |
| 5,711,008 | 1/1998 | Gallant et al. | 370/328 |
| 5,729,536 | 3/1998 | Doshi et al. | 370/395 |
| 5,793,762 | 8/1998 | Penners et al. | 370/352 |
| 5,808,502 | 8/1998 | Dell et al. | 379/114 |

FOREIGN PATENT DOCUMENTS

| | | |
|---|---|---|
| 2316266 | 11/1996 | United Kingdom . |
| 2315190 | 7/1997 | United Kingdom . |

*Primary Examiner*—Huy D. Vu
*Attorney, Agent, or Firm*—Jones, Volentine, Steinberg, & Whitt, L.L.P.

[57] ABSTRACT

At least one base station is connected to at least one central office via a T1/E1 trunk. Some channels of the trunk are assigned to carry PCM data destined for the public switched telephony network via the central office, while other channels of the truck are assigned to carry packet data destined for the internet via the central office. The base station includes a wireless subscriber interface, a PCM interface, a packet data interface and a selector circuit which selectively couples an input/output of the subscriber interface to either one of an input/output of the PCM interface or an input/output of the packet data interface.

15 Claims, 8 Drawing Sheets

WIRELESS INTERNET NETWORK ARCHITECTURE FOR VOICE AND DATA COMMUNICATIONS

BACKGROUND OF THE INVENTION

1. Field of the Invention

The present invention relates to a network architecture for achieving both voice and data service over the internet and more particularly, to a network architecture in which plural internet base stations are deployed each having high-capacity trunk connections with central offices for internet and ISDN access and wireless transceivers for subscriber voice and data communication.

2. Description of the Related Art

The internet phone is known for achieving voice-to-voice communication over the internet. As shown in FIG. 1, this is done by using the facilities of local telephone companies (and sometimes long distance carriers). That is, a first user computer 11 most typically dials via a modem 12 into a local telephone exchange 13. The first computer 11 is equipped with a microphone 16 and a speaker 17. The local telephone exchange 13 routes the "call" (i.e., modulated voice data) to an internet server 14 which, after establishing two-way communication with the computer 11 over the telephone line 15, places packetized voice data on the packet switching network of the internet 19. At the far end, the second user computer 11 (also having a modem 12, microphone 16 and speaker 17) similarly establishes two-way communication with another local exchange carrier 13, which in turn connects with an internet server 14. Packetized voice data is passed back and forth over the internet between the internet servers 14, which transmit (and receive) modulated voice data to (and from) the respective computers 11. The modems 12 demodulate the modulated voice data for sound reproduction on the speakers 17.

In some cases, as shown in FIG. 2, one or both user computers may require use of long distance carrier lines to connect to an internet server. That is, in some cases the internet server is not directly accessible by the local exchange carrier.

At least one disadvantage of this conventional scheme resides in the need to use the facilities of the local and sometimes long distance carriers. That is, the tarriff structure of such carriers often makes extensive use thereof cost prohibitive.

As a separate matter, internet access over cellular/mobile telephone channels is also well known. However, such requires the use of mobile switching centers which in turn are connected to the local exchange carrier and sometimes long distance carrier for routing to an internet server.

SUMMARY OF THE INVENTION

It is an object of the present invention to provide a network architecture which allows for voice and data communication between subscribers without using facilities of the local and long distance exchange carriers. It is also an object of the present invention to eliminate the need for the mobile switching center, and to distribute a handover process carried out as subscribers move from one service area to another. It is still a further object of the invention to provide a network architecture capable of communication with the existing public switched telephone network as well as the new internet based phones. Yet another object of the invention is to reduce interconnection costs.

According to the invention, local fixed phone lines of the local exchange carrier are bypassed by wireless connections, while long distance carriers' connections are bypassed by the packet switching network commonly known as the internet.

The communications network of the invention includes at least one base station and at least one central office. The base station of the invention includes a subscriber interface which receives and transmits subscriber signals, a PCM interface which receives and transmits pulse code modulation data, a packet data interface which receives and transmits packet data, and a selector circuit which selectively couples the subscriber interface to either one of the PCM interface and the packet data interface. The central office of the invention, which is operatively coupled to the PCM interface and the packet data interface of the at least one base station, routes the pulse code modulation data recieved from the PCM interface of the at least one base station to a public switched telephony network, and the pulse code modulation data recieved from the public switched telephony network to the PCM interface of the at least one base station, and routes the packet data received from the packet data interface of the at least one base station to an internet gateway, and packet data received from the internet gateway to the packet data interface of the at least one base station.

In the preferred embodiment of the invention, the subscriber interface is a wireless transceiver.

The at least one base station and the at least one central office are connected via a multi-channel trunk, such as a T1/E1 trunk, and a first group of channels of the multi-channel trunk is assigned to carry the pulse code modulation data and a second group of channels of the multi-channel trunk is assigned to carry the packet data.

A subscriber location register is provided which stores data indicative of respective subcriber locations, wherein the central office accesses the subscriber location register to identify one of plural different base stations to which the pulse code modulation data and the packet data is to be routed.

The base station further includes an encoder which encodes the subscriber signals to obtain a subscriber encoded signal, and a PCM coder which is operatively coupled to the PCM interface and which converts the subscriber encoded signal to the pulse code modulation data, wherein the selector circuit receives the subscriber encoded signal and selectively applies the subscriber encoded signal to either one of the PCM coder and the packet data interface.

The selector circuit also receives a remote subscriber encoded signal from the packet interface, and the at least one base station further includes a control circuit which compares a signal quality of the subscriber encoded signal with a signal quality of the remote subscriber encoded signal, and which controls the selector circuit to output the remote subscriber encoded signal back to the packet data interface when the signal quality of the remote subscriber encoded signal is within predetermined acceptance parameters relative to the subscriber encoded signal received from the encoder.

BRIEF DESCRIPTION OF THE DRAWINGS

The objects and advantages of the invention will be made clear by the detailed description which follows, with reference to the accompanying drawings, in which.

DETAILED DESCRIPTION OF THE PREFERRED EMBODIMENTS

Figure 1:
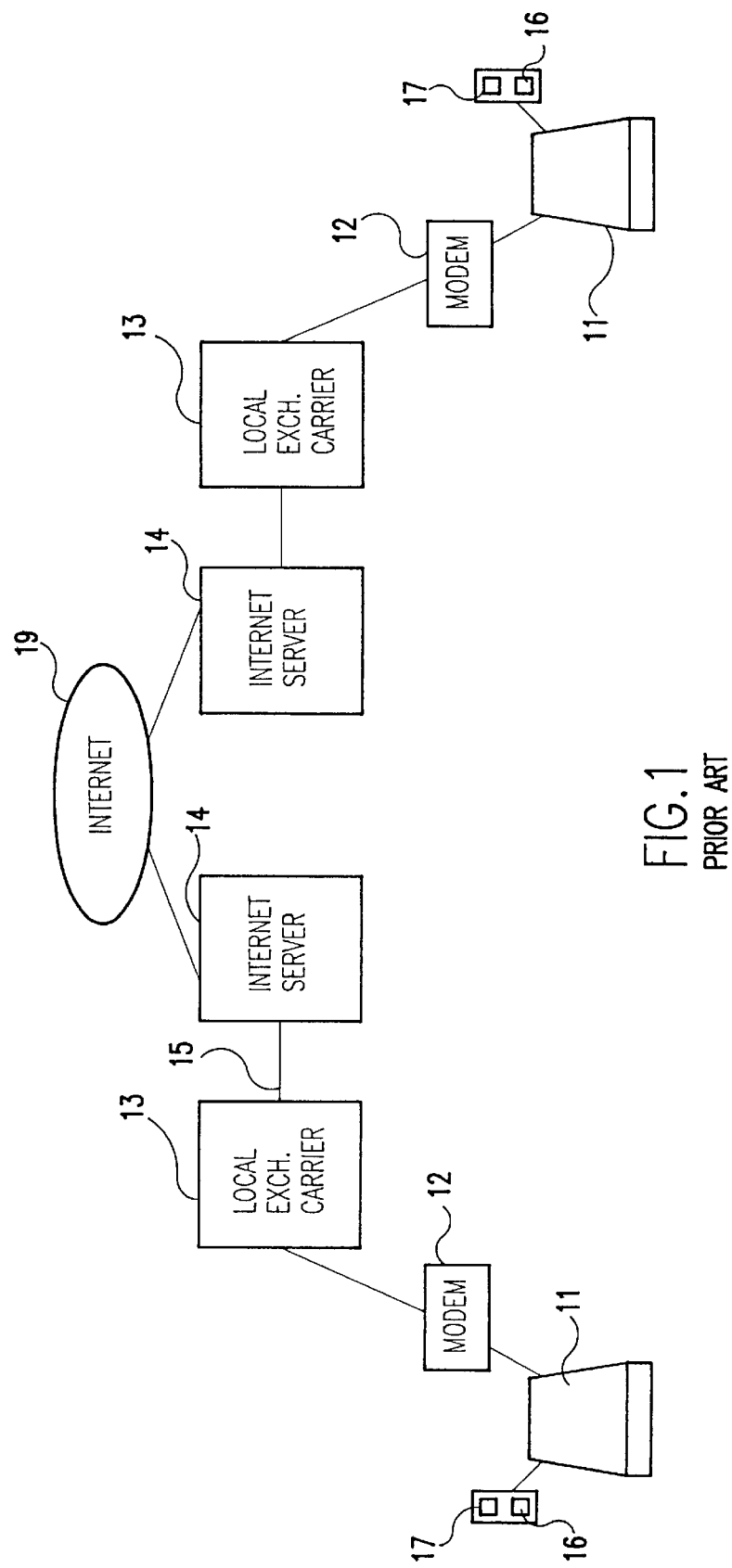
FIGS. 1 and 2 are network diagrams for explaining a conventional manner of placing a voice-to-voice call over the internet.
Figure 2:
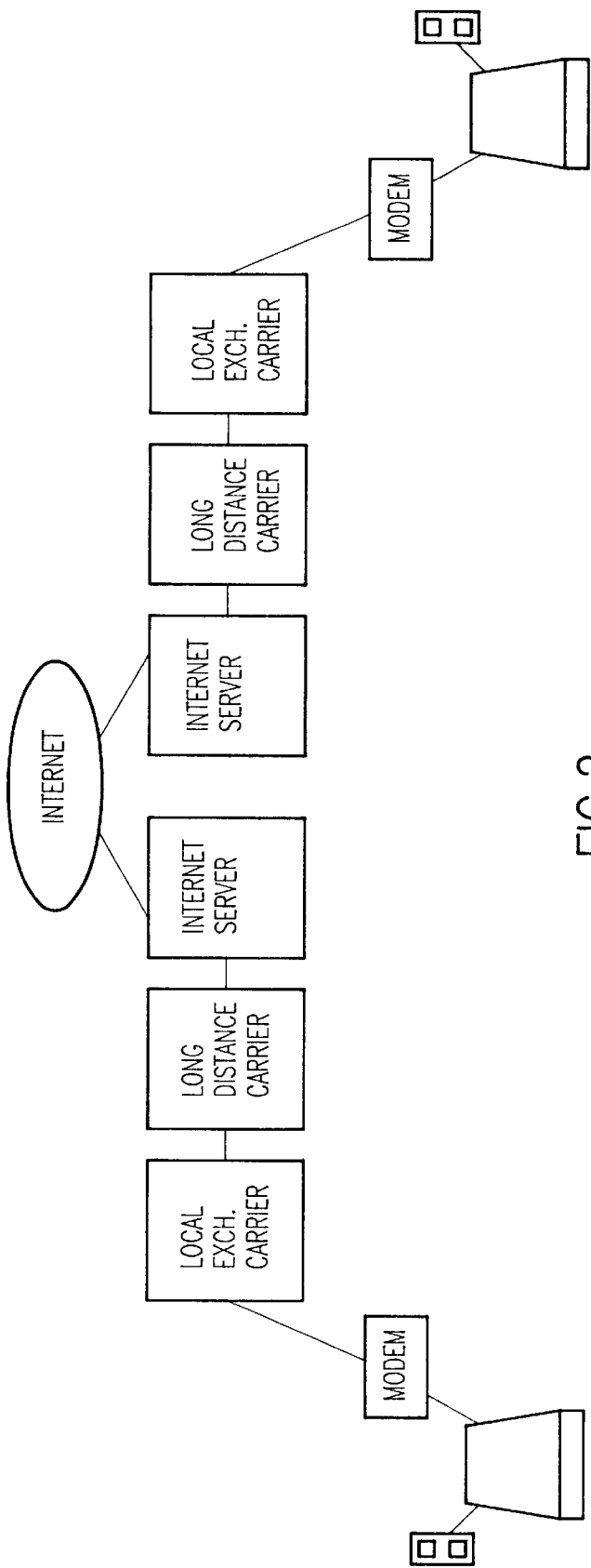
Figure 3:
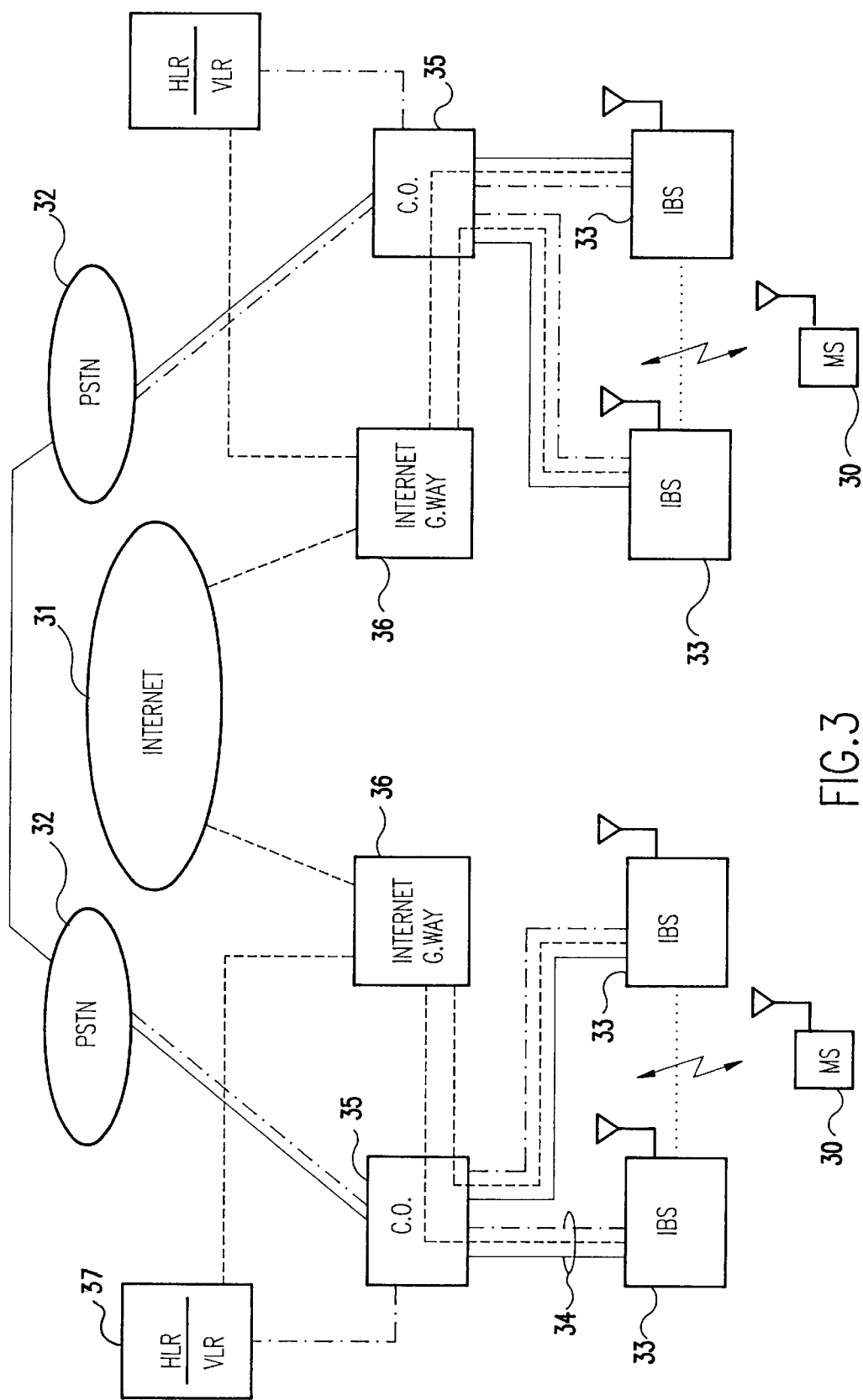
FIG. 3 is a network diagram of the wireless internet architecture of the present invention.

FIG. 3. illustrates a schematic representation of the wireless internet network architecture of the present invention. The network allows mobile subscribers (MS) 30 to trade voice and data messages with each other over the internet network 31, and to trade voice and data messages with others over the public switched telephony networks (PSTN) 32.

Reference numeral 33 in FIG. 3 is an internet base station (IBS) of the invention and is described in greater detail below. As shown, each IBS 33 is capable of establishing two-way radio communication with any one or more of the plural mobile subscribers 30. Also, one or more IBSs 33 are connected by way of high-capacity T1/E1 trunks 34 to a central office (CO) 35. The channels of each T1/E1 line are designated voice circuits (the solid line) and control circuits (the dot-dashed line) which together form an ISDN line, and data packet circuits (the dashed line) which constitute an internet connection. The central office 35 is in turn connected to both an internet gateway 36 and the public switched telephony network 32. The connection to the internet gateway 36 is by way of packet data circuits, and the connection to the public switched telephony network is by way of voice and control circuits. The internet gateways 36 are connected in the usual manner to the packet switching network of the internet 31. And finally, databases 37 are provided containing a home location register (HLR) and visiting location register (VLR). As will be explained below, the registers HLR and VLR exchange packet data with the internet gateway 36 and control data with the central office 35.

Figure 4:
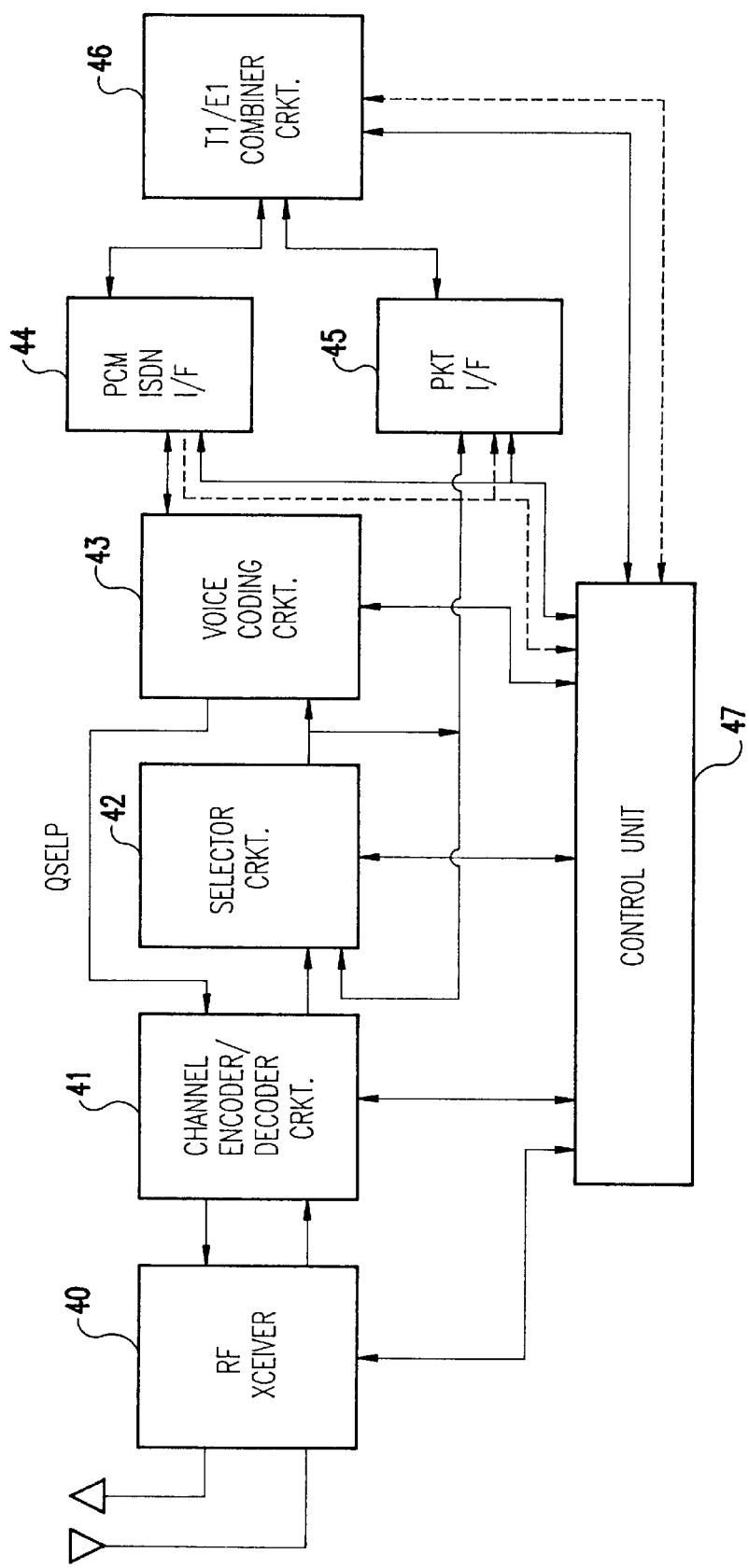
FIG. 4 is a block schematic diagram of the internet base station of the wireless internet architecture of the present invention.

An embodiment of the internet base station 33 (FIG. 3) is shown in FIG. 4. An RF front end transceiver 40 transmits and receives high-frequency radio signals to and from the mobile subscribers 30 (FIG. 3). A channel encoder/decoder circuit 41 encodes received RF control and traffic signals and decodes the control and traffic signals. In the embodiment, the QSELP signals are CDMA compressed voice coded signals at 8 or 13.3 kbps. A selector circuit 42 receives a first encoded signal from the encoder/decoder circuit 41 and a second signal from a packet I/F circuit 45, and, under control of a control circuit 47 (as described in more detail below with reference to FIG. 7), selectively applies one of the signals to a voice coding circuit 43 or to the packet I/F circuit 45.

The voice coding circuit 43 converts an encoded QSELP signal from the selector circuit 42 into a pulse code modulation (PCM, typically Å or μ law) signal, and visa versa. A PCM/ISDN interface (I/F) 44 is interposed between the voice coding circuit 43 and a T1/E1 combiner circuit 46, and the packet interface (I/F) circuit 45 is interposed between the selector/switching circuit 42 and the T1/E1 combiner circuit 46. The T1/E1 combiner circuit 46 combines the PCM signals or the packet signals and control signals onto the channels of the T1/E1 trunk line 34 (FIG. 3) connected to the central office 36 (FIG. 3). The control unit 47 (e.g. central processing unit) receives and transmits various control signals from and to the circuits 40–46 to control the overall operation (as described below) of the internet base station.

Referring now to the flow charts of FIGS. 5–7, the operation of the wireless internet network of the invention will now be described.

Figure 5:
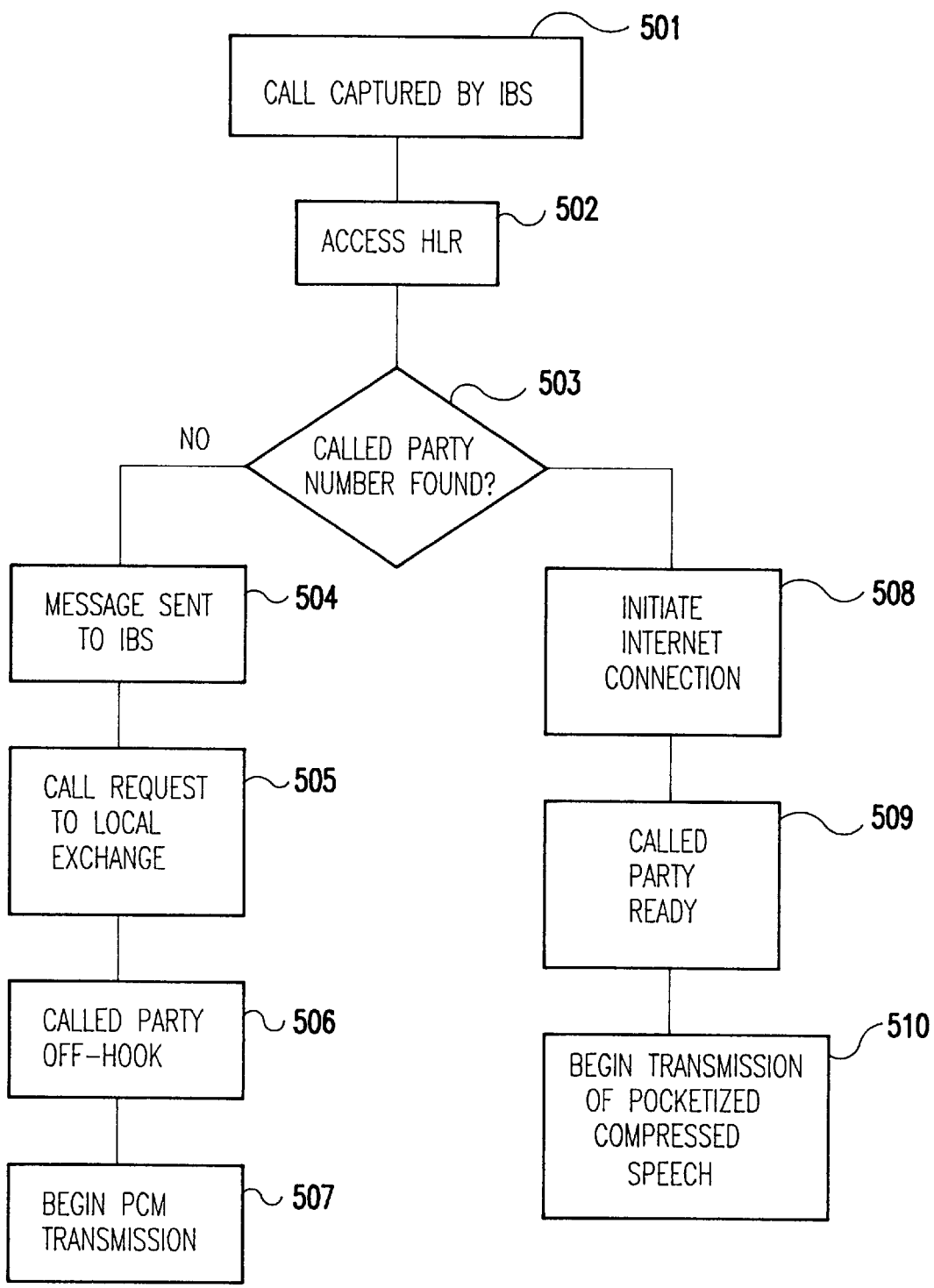
FIG. 5 is a flow chart for explaining an inbound scenario in which a call is originated from an internet base station and thus inbound into the network.

FIG. 5 depicts the scenario when a mobile subscriber places (initiates) a call by dialing a destination number which is captured by the internet base station. (Step 501).

The control unit 47 initially accesses the home location register HLR (and/or visiting location register VLR) via the T1/E1 combiner circuit to request indentification of the called party number and to determine the last known location of the called mobile subscriber. (Step 502). If the requested called party number is not found in the HLR, the HLR sends back the appropriate message to the IBS. (Steps 503 and 504). In this case, the call request is considered by the IBS as a mobile-to-land line equipment directed call. The IBS connects this call request to the local exchange via an ISDN connection provided by a local exchange carrier. (Step 505). When the called party goes off-hook (step 506), the connection is established and the IBS begins transmission of 64 kbps PCM voice towards the called party. (Step 507). From this standpoint, all aspects of the call are handled like a standard ISDN voice or data call.

On the other hand, when the IBS's request to the HRL is returned with a positive acknowledgment, the called party is reachable via internet connection. In this case, the IBS intiates an internet based voice call connection. (Step 508). When the call set-up procedure indicates that the called party is ready for conversation (step 509), it transmits packetized compressed speech to the called party's address. (Step 510). At the same time, the called party is doing the same in the calling party's direction.

Figure 6A:
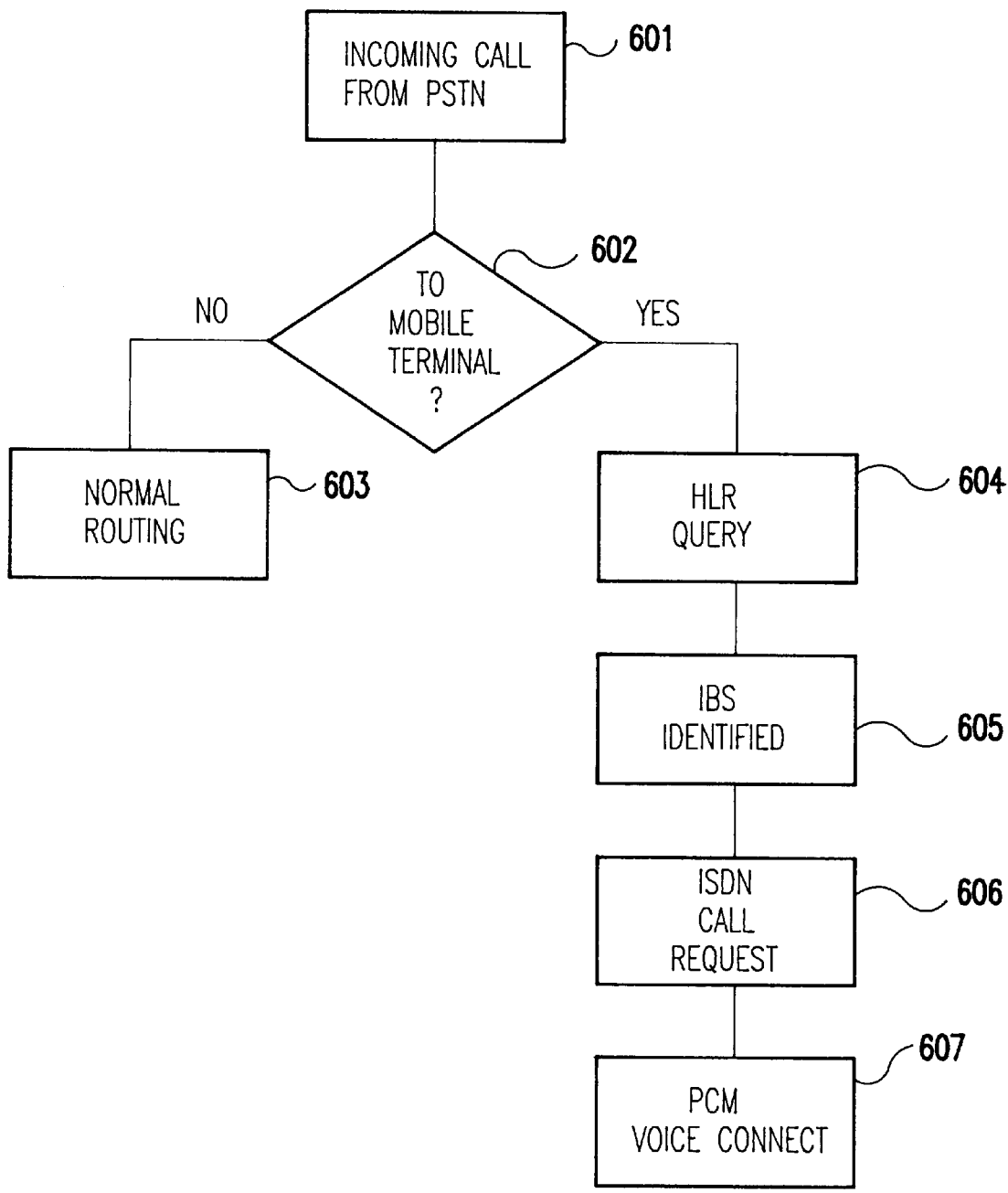
FIGS. 6a and 6b are flow charts for explaining an outbound scenario in which a call is destined for an internet base station and thus outbound from the network.
Figure 7:
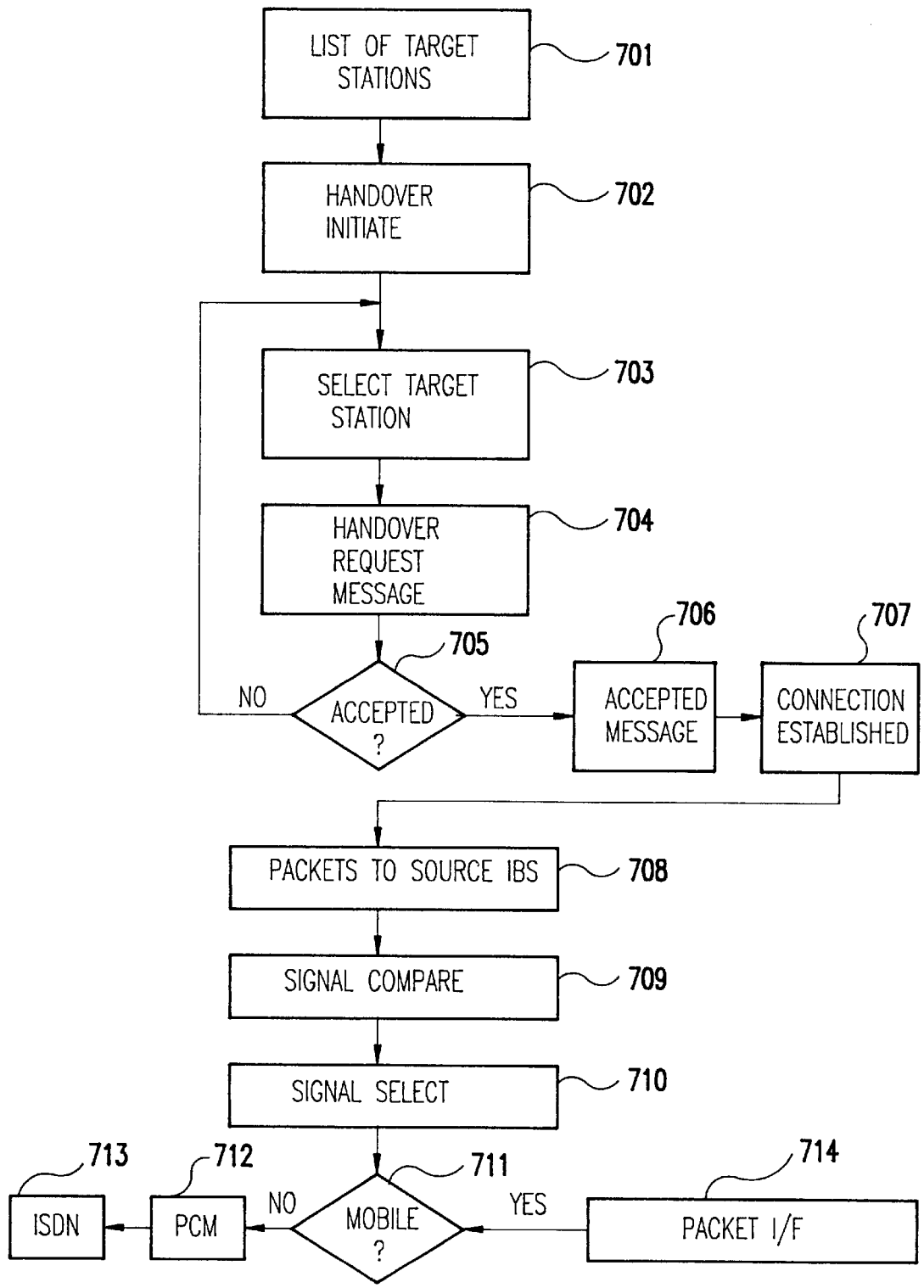
FIG. 7 is a flowchart for explaining a handover process in which a subscriber is passed from one internet base station to another.

Referring now to FIG. 6a, when a call request arrives to the local exchange (central office) from the public switched telephony network (step 601), the local exchange looks into its own database to determine whether the called number is a standard call for a fixed terminal attached to the switch or something special, like a mobile terminal. (Step 602). If it is not a mobile terminal, then the call proceeds in the known manner. (Step 603). If it is a mobile terminal, the National IN capability of the ISDN switches triggers a query of the HLR. (Step 604). The HLR identifies the IBS which contains the last known location of the called mobile subscriber. (Step 605). Based on this information, the local exchange initiates an ISDN call request to the identified IBS (step 606) which turns this request into a paging request for the called mobile subscriber. If the mobile subscriber responds to the paging request, the connection is established using 64 kbps PCM voice. (Step 607).

Figure 6B:
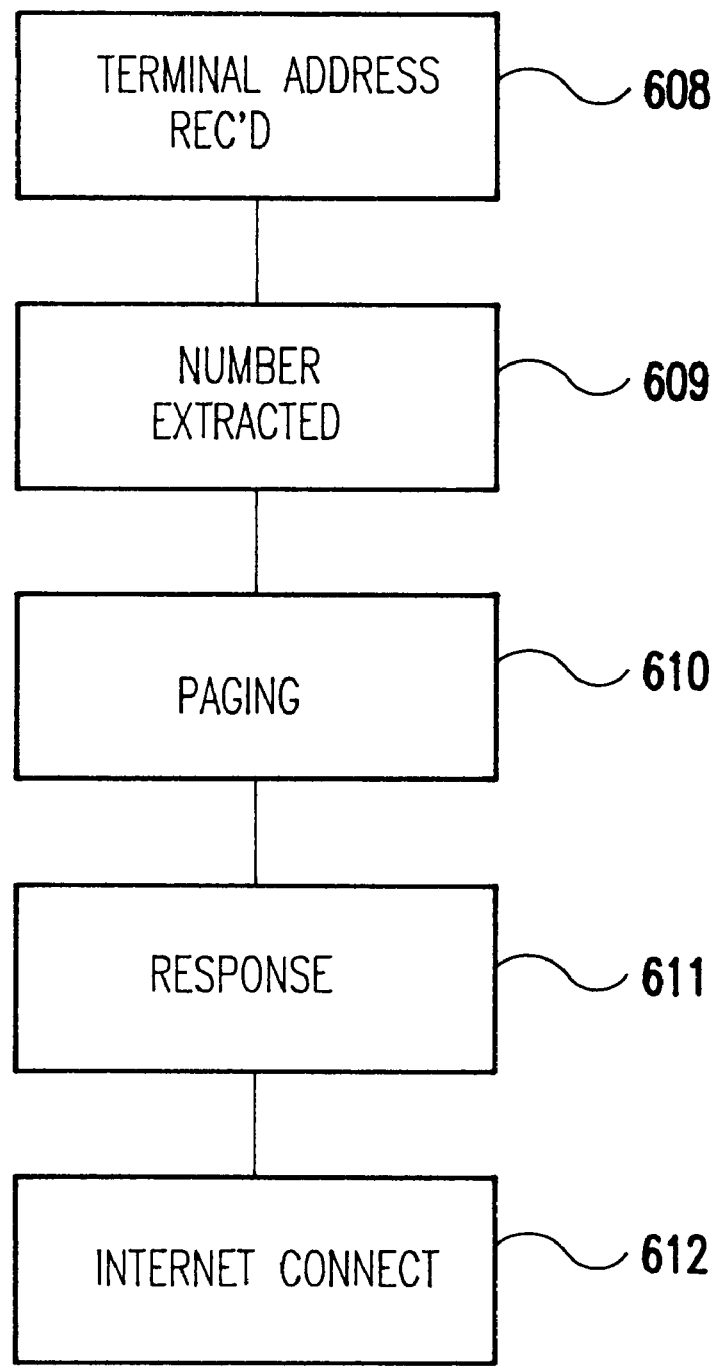

FIG. 6b is for describing an internet based call request. Such a call is delivered to the right IBS since, as described above (step 502, FIG. 5), the orginating IBS queries the HLR for the last known location of the called mobile subscriber. The HLR response to the query contains the internet address of the called party's IBS. Thus, the destination IBS (i.e., the called party's IBS) directly receives a message from the initiating IBS together with the called party's terminal address. (Step 608). When the called party's serving IBS receives the request, it extracts the called party's number (step 609) and turns it into a paging message. (Step 610).

When the called mobile subscriber responds to the page (step 611), the IBS connects the called subscriber to the calling subscriber by way of the internet connection to the central office using compressed speech packets.

The handover scenario will now be described with reference to FIG. 7. When a mobile subscriber leaves the coverage area of the serving IBS (i.e., the "source" IBS), a handover must occur in order to provide uninterrupted service to the user. Based on transmission signal parameters, the mobile subscriber is continuously communicating a list of target stations which represents its view of the best potential serving IBS's to the source IBS. (Step 701). When the source IBS decides that a handover is in order (step 702), the source IBS selects the best target station from the mobile subscriber provided list (step 703) and sends to that station a handover request message via its internet connection (step 704). The target IBS may or may not accept the request (step 705). If the target IBS does not accept the request, a next most favorable target station is selected (step 703) by the source IBS and a handover request is transmitted thereto (step 704).

If the target IBS accepts the request, it sends an accept message (step 706) and immediately tries to aquire the mobile subscriber. When the connection is established (step 707), the target IBS sends its incoming packets to the source IBS (step 708). Referring also to FIG. 4, the incoming packets of the target IBS are passed through the packet I/F 46 and applied as an input to the selector circuit 43. Under control of the control unit 47, the source IBS compares the quality of the channel encoded signal received from the encoder/decoder circuit 42 and the signal received from the packet I/F 46 (step 709). The best quality signal is selected and output from the selector 43 (step 710). If the called party is a fixed terminal on the public switched telephone network, the selected best quality signal is applied to the voice coder 43 where it is pulse code modulated (steps 711 and 712) and transferred to the local switch via the ISDN line (step 713). On the other hand, if the called party is another mobile subscriber, the best quality signal is directly applied without compressing speach to/from PCM conversion to the packet I/F 46 for transmission via the internet connection (step 714).

When the mobile subscriber is firmly under control of the target IBS, the target IBS instructs the source IBS to release all radio resources for other uses, except the selector and interface connections which are used as long as the call exists.

Although the present invention has been described in relation to particular embodiments thereof, many other variations and modifications and other uses will become apparent to those to those skilled in the art. It is understood, therefore, that the present invention be defined not by the specific disclosure herein, but only by the appended claims.

What I claim is:

1. A communications network comprising:
   at least one base station including (a) a subscriber interface which receives and transmits subscriber signals, (b) a PCM interface which receives and transmits pulse code modulation data, (c) a packet data interface which receives and transmits packet data, and (d) a selector circuit which selectively couples said subscriber interface to either one of said PCM interface and said packet data interface; and
   at least one central office, operatively coupled to said PCM interface and said packet data interface of said at least one base station, which routes the pulse code modulation data received from said PCM interface of said at least one base station to a public switched telephony network, and pulse code modulation data received from the public switched telephony network to said PCM interface of said at least one base station, and which routes the packet data received from said packet data interface of said at least one base station to an internet gateway, and packet data received from the internet gateway to the packet data interface of said at least one base station.

2. A communications network as claimed in claim 1, wherein said subscriber interface is a wireless transceiver.

3. A communications network as claimed in claim 1, wherein said at least one base station and said at least one central office are connected via a multi-channel trunk, and wherein a first group of channels of said multi-channel trunk is assigned to carry the pulse code modulation data and a second group of channels of said multi-channel trunk is assigned to carry the packet data.

4. A communications network as claimed in claim 3, wherein said multi-channel trunk is a T1/E1 trunk.

5. A communications network as claimed in claim 4, wherein said subscriber interface is a wireless transceiver.

6. A communications network as claimed in claim 1, further comprising a subscriber location register which stores data indicative of respective subcriber locations, wherein said central office accesses said subscriber location register to identify one of plural different said base stations to which the pulse code modulation data and the packet data is to be routed.

7. A communications network as claimed in claim 5, further comprising a subscriber location register which stores data indicative of respective subcriber locations, wherein said central office accesses said subscriber location register to identify one of plural different said base stations to which the pulse code modulation data and the packet data is to be routed.

8. A communications network as claimed in claim 1, wherein said base station further includes an encoder which encodes the subscriber signals to obtain a subscriber encoded signal, and a PCM coder which is operatively coupled to said PCM interface and which converts the subscriber encoded signal to the pulse code modulation data, said selector circuit receiving the subscriber encoded signal and selectively applying the subscriber encoded signal to either one of said PCM coder and said packet data interface.

9. A communications network as claimed in claim 7, wherein said base station further includes an encoder which encodes the subscriber signals to obtain a subscriber encoded signal, and a PCM coder which is operatively coupled to said PCM interface and which converts the subscriber encoded signal to the pulse code modulation data, said selector circuit receiving the subscriber encoded signal and selectively applying the subscriber encoded signal to either one of said PCM coder and said packet data interface.

10. A communications network as claimed in claim 8, wherein said selector circuit receives a remote subscriber encoded signal from said packet interface, and wherein said at least one base station further comprises a control circuit which compares a signal quality of the subscriber encoded signal with a signal quality of the remote subscriber encoded signal, and which controls said selector circuit to output the remote subscriber encoded signal back to the packet data interface when the signal quality of the remote subscriber encoded signal is within predetermined acceptance parameters relative to the subscriber encoded signal received from said encoder.

11. A communications network as claimed in claim 9, wherein said selector circuit receives a remote subscriber encoded signal from said packet interface, and wherein said at least one base station further comprises a control circuit which compares a signal quality of the subscriber encoded signal with a signal quality of the remote subscriber encoded signal, and which controls said selector circuit to output the remote subscriber encoded signal back to the packet data interface when the signal quality of the remote subscriber encoded signal is within predetermined acceptance parameters relative to the subscriber encoded signal received from said encoder.

12. A base station for use in a communications network, the communications network including both the public switched telephony network and the internet network, said base station comprising:

a subscriber interface which receives and transmits subscriber signals;

a PCM interface which receives and transmits pulse code modulation data;

a packet data interface which receives and transmits packet data;

an encoder which encodes the subscriber signals to obtain a subscriber encoded signal;

a PCM coder which is operatively coupled to said PCM interface and which converts the subscriber encoded signal to the pulse code modulation data; and a selector circuit which receives the subscriber encoded signal and selectively applies the subscriber encoded signal to either one of said PCM coder and said packet data interface.

13. A base station as claimed in claim 12, wherein said selector circuit receives a remote subscriber encoded signal from said packet data interface, and wherein said base station further comprises a control circuit which compares a signal quality of the subscriber encoded signal with a signal quality of the remote subscriber encoded signal, and which controls said selector circuit to output the remote subscriber encoded signal back to the packet data interface when the signal quality of the remote subscriber encoded signal is within predetermined acceptance parameters relative to the subscriber encoded signal received from said encoder.

14. A base station as claimed in claim 12, wherein said subscriber interface is a wireless transceiver.

15. A base station as claimed in claim 13, wherein said subscriber interface is a wireless transceiver.

* * * * *